United States Patent [19]

Senaha et al.

[11] 4,358,507
[45] Nov. 9, 1982

[54] MULTI-LAYER REFLECTORS

[75] Inventors: Susumu Senaha; Suizo Kyo; Susumu Shimomura; Akira Akagami; Hiroshi Imai; Akiro Ohno; Shitomi Katayama; Suguru Nomura, all of Yokohama, Japan

[73] Assignees: NHK Spring Co., Ltd.; Yokohama Kiko Co., Ltd., both of Kanagawa, Japan

[21] Appl. No.: 93,564

[22] Filed: Nov. 13, 1979

[30] Foreign Application Priority Data

Nov. 13, 1978 [JP] Japan .................... 53-138904

[51] Int. Cl.$^3$ .................... G02B 5/08; B32B 17/10; B32B 15/08
[52] U.S. Cl. .................... 428/429; 350/288; 350/292; 350/320; 428/412; 428/415; 428/416; 428/426; 428/432; 428/433; 428/434; 428/446; 428/447; 428/450; 428/458; 428/457; 428/460; 428/463; 428/469; 428/472; 428/913
[58] Field of Search ............ 428/429, 446, 447, 428, 428/452, 450, 411, 469, 472, 432, 433, 434, 913, 426, 450, 412, 457, 427, 625, 626; 350/320, 288, 292; 427/124, 125, 295, 330

[56] References Cited

U.S. PATENT DOCUMENTS

| | | | |
|---|---|---|---|
| 2,519,722 | 8/1950 | Turner | 350/320 |
| 2,676,117 | 4/1954 | Colbert | 350/288 |
| 3,026,177 | 3/1962 | St. Pierre | 350/288 X |
| 3,026,210 | 3/1962 | Coble | 350/288 X |
| 3,398,040 | 8/1968 | Allen | 350/288 X |
| 3,410,636 | 11/1968 | Herrick | 350/288 |
| 3,610,741 | 10/1971 | Davies | 350/320 |
| 3,687,713 | 8/1972 | Adams | 350/288 |
| 3,837,895 | 9/1974 | Pyror | 428/429 |
| 4,009,947 | 3/1977 | Nishida | 350/288 |

FOREIGN PATENT DOCUMENTS

| | | | |
|---|---|---|---|
| 653550 | 12/1962 | Canada | 428/429 |
| 618610 | 7/1978 | U.S.S.R. | 350/320 |

Primary Examiner—Ellis P. Robinson
Attorney, Agent, or Firm—Sughrue, Mion, Zinn, Macpeak & Seas

[57] ABSTRACT

A multi-layer coating reflector consisting of 3 or 4 layers of the present invention, which comprises a light reflective metallic vacuum-deposited layer disposed on a substrate which may, or may not, have a resin layer thereon and a light transmittable inorganic or light transmittable resin layer which may, or may not, be further disposed on the surface of that, use for one or both of the resin layers high aryl silicone resin in which the mole percentage of aryl/alkyl+aryl is 65–100%.

With the use of such high aryl silicone resin, when said resin is a protective layer, the reflector has excellent resistance to light, weathering, water, humidity, chemicals and bending and when it is on the substrate, the light reflective metal has excellent reflection properties and obtains bright reflected images, high precision light collection and distribution properties.

9 Claims, No Drawings

MULTI-LAYER REFLECTORS

DETAILED DESCRIPTION OF INVENTION

The present invention relates to reflectors suitable for use in lighting shades, optical instruments, sun-light etc., which comprise a metallic or nonmetallic substrate with or without a resin layer coated thereon, a light-reflective metal layer deposited on said substrate, and a protective layer coated on said metal layer.

Typical reflectors conventionally used may be classified into the following groups:

(1) The one in which the surface of a metal such as stainless steel or aluminum is subjected to buff, electrolytic or chemical polishing.

(2) The one in which the surface of a metal such as iron or aluminum is given porcelain-enamel treatment.

(3) The one in which the surface or back side of a glass or transparent plastic is coated with a light-reflective metal, such as aluminum, by vacuum evaporating method or coated with silver by the silver mirror reaction, and (4) The one in which on the surface of materials of (1) and (3) above is disposed a transparent resin film.

The example (1) needs polishing of the surface since the buff-polished surface is rough to obtain desired light reflection. Electrolytic or chemical polishing is a wet process, and thus arised an environmental pollution problem due to the chemicals used. In addition, the polished surface is still insufficient in regular reflection to be used as a light-reflective surface.

Reflectors (2) have tolerable smoothness of the surface of porcelain-enameled treatment; however, their regular reflectivity is very poor, producing only randomly reflected or diffused rays.

Reflectors (3) having a light-reflective metal surface show satisfactory regular reflection. However, they have poor resistance to chemicals, weathering and abrasion. Total reflection is no good with metal plating with nickel and chromium, though regular reflection is good. Being a wet process, metal plating has the disadvantage of environmental pollution problems due to the chemicals used.

Reflectors (4) are intended to overcome the aforementioned disadvantages and show high light reflectivity with a good protection of the light-reflective metal surface. However, the problems are the poorer resistance of resin to heat, abrasion, light, weathering and chemicals; resins with insufficient resistance to light, heat and weathering will discolor or loose their transparency and may be scratched when wiped with a cloth or the like for cleaning. A thick coat of resin will result in increased temperature rise in the surface and deteriorated physical properties due to increased absorption of light and infrared rays.

The object of the present invention is to offer reflectors with excellent reflectivity as well as superb resistance to heat, chemicals and weathering, which are free from the disadvantages of conventional reflectors.

The present inventors formerly succeeded in manufacturing heat-resistance coated sheets with excellent characteristics by using a specific, high aryl-content silicone resin having a mole percentage of 65–100% of aryl/(alkyl+aryl) (Japanese Patent Application No. 038409, 1978). This silicone resin is obtained by curing, which includes condensing and polymerizing, a liquid or low melting polyaralkylsiloxane consisting of structural units having the general formula represented below under specific conditions:

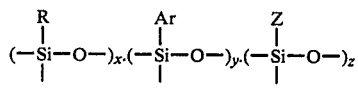

wherein R is a lower (carbon) alkyl radical such as methyl, ethyl and propyl, among which methyl is preferred; Ar is an aryl radical such as phenyl, tolyl, and naphthyl, among which phenyl is preferred; Z represents a functional group such as a hydroxy group, an alkoxy group such as methoxy, ethoxy, propoxy and butoxy, or an acyloxy group such as acetoxy, propyloxy and butyloxy which will condense to form a polymer and x, y and z represent the molar proportion for the unit for which they are subscripts, respectively. The free bonds in the structural formula above may carry one of the aforesaid functional groups or the bonds in two structural units may link to form a bridging bond, or an arbitrary monofunctional radical such as hydrogen may be carried by any of the free bonds provided the following conditions are met: (1) the mole fraction of aryl radicals to the sum of the aryl and alkyl radicals is 0.65 to 1.00, the polymerizable functionality is 2 to 3 and the ratio of the number of carbon atoms to the number of silicone atoms is 4.25 to 16. On further studies it is found that excellent reflectors can be obtained by utilizing such an high aryl-content silicone resin. The present invention was accomplished based on these findings. A multi-layer coating reflector consisting of 3 or 4 layers of the present invention, which comprises a light reflective metallic vacuum coated layer disposed on a substrate which may or may not have a resin layer thereon and a light transmittable inorganic or light transmittable resin layer which may or may not, be further disposed on the surface of that, used for one or both of the resin layers high aryl silicone resins in which the mol percentage of (aryl/alkyl+aryl) is 65–100%.

The high aryl-content silicone resins herein referred to mean the heat-cured polyarylalkylsiloxanes defined in the prior application, Japanese Patent Application No. 038409 (1978), which have a ratio of aryl radical/(aryl radical+alkyl radical) ranging from 65 to 100 mole %, and a carbon to silicon ratio ranging from 4.25 to 16 and contain 2 to 3 polymerizable functional groups. If the molar percentage of the aryl radicals mentioned above is less than 65%, heat resistance will be poorer.

The reason that the number of functional groups is set at 2–3 is that coating of resin is easy and after the coating the resin is polymerized and cured by heating.

In addition to the higher hardness, such silicone resins have the following advantages not found in the silicone resins conventionally used:

(1) The high aryl content not observed in conventional silicone resins ensures higher thermal stability compared with the conventional silicone resins containing alkyl radicals alone or having a high alkyl content; serviceable at temperatures lower than 250° C. for long periods, and tolerable at temperatures between 250° and 600° C. if not exposed over a prolonged period. It also assures excellent resistance to light, weathering, chemicals and water.

(2) Good adhesion to substrates (3) Excellent characteristics for vacuum depositing of light-reflective metals; unsurpassed in high-temperature vacuum deposition, in particular (4) Very close to glass and quartz in refractive index; looks as if there were no overcoat (5) Colorless and transparent coated film (6) Excellent flex resistance; little or no cracks and delamination by bending (7) Good workability; little or no environmental pollution problems Because of the outstanding properties as listed above, this type of silicone resin can be applied to high temperature uses and other new applications for which the conventional alkyl-rich silicone resins cannot be successfully employed.

Both metallic and nonmetallic substrates can be used in the present invention. However, they must withstand the ambient conditions, such as stresses and heat, to which the reflectors are exposed while in service. Typical examples of metallic substrates are metals and alloys, such as iron, stainless steel, copper, brass, bronze, nickel, aluminum and duralumin; plated metal plates such as galvanized and tinned iron plates; and metal plates coated with a resin layer. As nonmetallic substrates may be mentioned, among others, various synthetic polymeric materials, glass, mica, ceramics, wood and paper. However, because of the need for vacuum deposition of a light-reflective metal, the materials containing water having a high vapor pressure under vacuum or low molecular weight material cannot be used; If such materials are to be used, they must be coated with resin. Examples of the synthetic polymeric materials used as the substrate in the present invention include epoxy resin, polyester resin, phenol resin, allyl resin, silicone resin, polycarbonate resin and urea resin. However, they are not limitative. The resins to be coated on the substrate surface are preferably applied solvent-free, followed by thermal cure or baking. But coating with a solvent, electrostatic coating or film lamination may also be employed. Any of the synthetic polymer resins mentioned above as the materials may be used for this purpose when a high aryl-content silicone resin is employed for a light transmittable protective layer, but a high aryl-content silicone resin must be applied on the substrate in other cases.

Light-reflective metals can be coated on the substrate by the vacuum deposition, sputtering, or ion plating process. Although somewhat different depending on the process used, metals that can be applied include aluminum, duralumin, silver, white gold, gold, nickel, chromium, indium, palladium, and vanadium. But they are not limitative. Other metals are also applicable; for example, copper, when used in the air, tends to react with oxygen, carbon dioxide and moisture to loose its light reflectivity. But it can be applied successfully if coated with a protective film.

The inorganic substances to be vacuum-deposited in the present invention include silicon oxide substances, such as quartz and rock crystal, and a family of glass, such as sodium glass, potassium glass, lead glass, borosilicate glass and aluminosilicate glass. These materials are crystalline or amorphous under no vacuum coating the coated but generally film becomes amorphous in most cases.

The process for manufacturing the multi-layer coating reflectors of the present invention is described below.

The light-reflective metals can be vacuum-deposited on the substrate surface by the vacuum deposition, sputtering or ion plating process, as stated before.

Of these, the vacuum depositing is the simplest method but the energy that can be utilized for coating is only the kinetic energy of evaporated metal particles within the mean free path, i.e., 0.1 eV or below. Consequently, the penetration of the metal particles into the substrate is 1 Å or below, resulting in weak coating. The adhesion value of the metal layer to the substrate is poor and the film density is low, with a consequent low peel strength.

The mean free path of evaporated metal particles increases with decreasing particle weight, increasing degree of vacuum, and rising temperature. Therefore, metals with lower atomic weight and smaller atomic diameter can be deposited more easily. The degree of vacuum should be $10^{-4}$ Torr, preferably $10^{-5}$ Torr, or below. An alloy whose component metals form a molecular compound or whose component metals have similar mean free path and vaporization rate can be successfully deposited by this method. If not, however, individual component metals are evaporated and deposited separately, yielding non-uniform or weak film. In this case, the sputtering process is recommended.

In the sputtering process, excited metal particles having larger kinetic energy than in the vacuum deposition are allowed to strike onto the substrate surface. With the kinetic energy ranging from several tens to several hundreds of electron volts, the metal particles penetrate into the substrate to a depth of from several to several tens of angstroms, producing stronger and more durable coating than in the vacuum evaporation process. The reflectivity of the metal layer obtained is also satisfactory. As opposed to the vacuum deposition, which is carried out by evaporation of alloy melt, this process produces gas from a solid target through sublimation. This enables the sputtering process to be used for vacuum depositing of alloys because dissociation into component metals is difficult to occur.

The problems associated with this process are the inconvenience that the coating materials must be shaped into a target with a special configuration, such as a disc form, and a cylinder, and the lower production efficiency due to lower coating rate.

The ion plating process may be subdivided into several types. When a process of high coating efficiency is used, penetration of metal particles to a depth of several angstroms is achieved with an energy of several KeV.

In contrast to the two vacuum deposition processes described above, the ion plating employs cationic metal particles instead of neutral particles. The positively charged particles are forced to move toward a cathode, that is, the charged substrate, and strike it at a higher velocity than in the sputtering process. Since the cationic particles are smaller in size than the corresponding neutral particles, the mean free path is longer than in the two processes mentioned above at the same temperature and pressure.

Typical ion plating processes are described below.

(1) Plasma ion plating

A voltage from several hundred to several thousand volts is applied across the coating material and the substrate under a reduced pressure of $10^{-2}$ to $10^{-3}$ Torr to cause glow discharge, and the vaporized neutral metal particles are ionized in the resultant plasma and hit against the substrate. This process features a high ionizing rate amounting to about 50% and the high mechanical strength of the film formed. Another advantage is the capability of deposition also on the back surface of the substrate because the metal particles move along the lines of electric force in the electric field. However, the substrate must be thermally stable because of the short mean-free-path, and special means must be devised for coating of large substrates.

(2) RF ion plating

This process is to pass evaporated particles through a high frequency oscillating coil and to ionize them for coating. Deposition is possible with a rather low degree of vacuum from $10^{-3}$ to $10^{-4}$ Torr with no excessive temperature rise in the cathode because the glow discharge is not required. The problems are the low ionizing rate and the failure of coating over a wide projected area because of the limited diameter of the RF oscillating coil used.

(3) Ion plating under voltage impression

This is a modified plasma ion plating process in which a degree of vacuum ranging from $10^{-4}$ to $10^{-5}$ Torr is used. Although little or no glow is observed visually, the flow of cathode current is actually detected. Fairly good results are obtained at a degree of vacuum lower than around $10^{-4}$ Torr and with a voltage gradient of several tens V/cm or higher. This method provides effects intermediate between the plasma ion plating and the vacuum metallizing processes.

(4) Ionizing gun process

This process directly produces ionized metal particles by using an ionizing gun, as opposed to the three processes described above in which particles previously evaporated by resistance heating or electron beams are ionized by an electric field, plasma or high frequency waves.

Typical examples are the ionizing-gun method and the hollow cathode method, both allowing coating in a high vacuum with a high ionizing efficiency.

Ion plating must be carried out giving full consideration to the features of individual processes mentioned above, or the deposited light-reflective metal layers may discolor or become turbid, resulting in decreased reflectivity.

It is also essential to exclude reactive gases, such as air, from the system as far as possible in depositing a light-reflective metal, as otherwise the total reflectivity may decrease or the reflecting surface may become discolored.

The same equipment as described above may be employed to vacuum-deposit light transmittable inorganic substances. However, the operation methods differ to a considerable extent between the light reflective matal and the light transmittable inorganic substances.

The first point to be considered is the far greater energy required for melting, sublimating or evaporating inorganic substances than that required for light-reflective metals. Whatever deposition processes may be used, the deposition time will be longer than in the case of a light-reflective metal in the case of inorganics and the methods for evaporation and inonization will be limited. For example, most of the light-reflective metals can be melted and gasified by resistance heating using a high melting-point metal, whereas most of the inorganic substances must be gasified by means of electron beams or ion beams instead of resistance heat.

The second point is the fact that most inorganic substances melt only at the heated part and its neighboring section, as opposed to metals which can be uniformly heated and melted because of the good heat conductivity.

All the inorganic substances used in the present invention are compounds as opposed to light-reflective metals. This also requires special consideration in their vacuum deposition.

The high aryl-content silicone resins used in the present invention as the light transmittable protective resin layer and/or as the resin layer are polyarylalkylsiloxanes having an aryl radical/(aryl radical + alkyl radical) ratio ranging from 65 to 100 mole% and bearing two to three polymerizable functional groups. If the molar percentage of the aryl radical as mentioned above is less than 65%, the heat resistance of the cured film will be lower. With 2-3 functional groups, coating of resin is made easy and after the coating, the resin is caused to polymerize and cure by heating.

This high aryl-content silicone resin can be used as such when its viscosity is low. However, a solid or highly viscous liquid should be diluted with a solvent before application. As examples of the solvents may be mentioned, among others, aromatic hydrocarbons such as toluene and xylene; chlorinated aromatic hydrocarbons such as chlorobnezene and dichlorobenzene; and chlorinated aliphatic hydrocarbons such as methylene chloride and trichloroethylene. A higher concentration is preferable when a coating of larger thickness is desired, and a lower concentration is preferable for a smaller thickness. In the former case, however, it is rather preferable for a smaller thickness. In the former case, however, it is rather preferable to coat several times with a solution of moderate dilution because the application of a solution with an excessively high concentration will result in difficult evaporation of the solvent from the coated film and may often lead to the formation of films with poor characteristics. The suitable concentration is in the range from 5 to 70%, preferably from 5 to 30%.

The resin solution may be applied without a catalyst, but it is preferable to add a suitable curing catalyst to control the curing speed.

Any curing agents for silicone resins, including acid catalysts, basic catalysts and metal salt catalysts, can all be used.

As examples of the acid catalysts may be mentioned, among others, lead octoate, organic phosphates, trichloroacetic acid, boron trifluoride etherate, dimethyl sulfate, phenylpropionic acid, phosphorus pentoxide, toluenesulfonic acid, m-cresol, phenol, phosphoric acid, benzoic acid, polyphosphoric acid, amine hydrocholorides, sulfuric acid, benzenesulfonic acid, tin tetrachloride, phenylacetic acid and phenylbutyric acid.

The suitable basic catalysts include organic and inorganic salts such as tetrabutylammonium hydroxide, tetrabutylphosphonium hydroxide, lithium hydroxide, and potassium hydroxide, and ethylenediamine.

As examples of the metal salt catalysts may be mentioned, among others, dibutyltin dilaurate, stannous octoate, cobalt naphthenate, lead octoate, tetrabutyl titanate, tetraiso-propyl titanate, lead laurate, zinc stearate, dibasic lead octoate, dibutyltin mercaptide, tribenzyltin laurate and tribenzyltin stearate.

However, in order to achieve a good coating film with a smooth surface free from cracks, it is preferable to use a weak organic acid, a derivative thereof, a metal salt thereof, or a substance capable of forming any of these compounds by decomposition upon heating, alone or in combination. The preferable organic acid metal salts include the salts of amphoteric metals, such as tin and aluminum, and the salts of transition metals such as Fe, Ni and Co.

Typical examples are: organic acids such as octoic acid, acetic acid, propionic acid, benzoic acid, m-cresol, phenol, trichloroacetic acid, benzoyl peroxide and cumene hydroperoxide and substances capable of forming organic acids by decomposition upon heating, organic amines such as ethylenediamine and tetrabutylammonium hydroxide and substances capable of forming organic amines by decomposition upon heating, and organic acid metal salts such as nickel acetate, lead octoate, dimethyltin dilaurate and cobalt naphthenate. Particularly suitable catalysts are compound catalysts with moderate activity consisting of a metal salt and an acid or base, such as a combination of octoic acid and lead octoate, and ethylenediamine and nickel acetate.

The amount of a curing agent to be added may vary with its activity, but is generally 5 weight % or less, preferably 2 weight % or less.

A high aryl-alkylsiloxane solution with such a catalyst as specified above added is applied by the spray, brushing, dipping or other suitable method.

Curing can be accomplished by heating in an oven. Heating is carried out in the following three steps: First step: This step involves heating to temperatures between room temperature and the boiling point of the solvent used, to allow evaporation of the solvent before the curing reaction starts. Heating is conducted at temperatures from room temperature to 100° C., preferably from 30° to 60° C., generally for 5 to 100 minutes, preferably for 20 to 40 minutes. Second step: In this heating step, the precondensation reaction is allowed to proceed, in which most of the functional groups contained in the resin react together, with the liberation of a lot of low molecular compounds. If the reaction temperature in this step is too high, the film which is still weak will be damaged by the vaporizing of low molecular compounds, resulting in the formation of cracks and pinholes or delamination of the cured film. It is therefore preferable to carry out heating at temperatures from 80° to 230° C., preferably from 100° to 200° C. for 1 to 24 hours, preferably for 1 to 10 hours.

This step is unnecessary with silicone resins having no or a small amount of aryl radicals; however, with high aryl-content silicone resins having a lower rate of condensation, higher temperature or the use of a larger amount of active catalysts will yield weak or cracked films. Third step: During this step, the reaction of remaining condensing functional groups is completed and the cured film is aged. The suitable heating condition is 200° to 350° C., preferably 230° to 280° C. for 1 hour to 2 days, preferably 3 to 20 hours.

By heating under conditions specified above, excellent coated films free from cracks can be obtained.

The high aryl-content silicone resin used in the present invention forms a colorless, transparent film with an excellent light transmittance. Compared with the conventional silicone resins bearing alkyl radicals alone or rich in alkyl radicals, it shows a markedly higher resistance to heat; it endures continued use for long periods at temperatures below 250° C. and tolerates higher temperatures between 250° and 600° C. unless exposed for long periods. The resistance to light, weathering, chemicals, water and moisture is also good. It can be bended with little or no cracks and delamination. Its adhesion to the metal layer and the substrate is very excellent.

With these favorable characteristics, the high aryl-content silicone resin can be applied to the resin layer coated on the substrate and/or as the transparent protective layer, producing reflectors with excellent resistance to light, weathering, water, moisture, chemicals and bending. Furthermore, if a light-transmittable inorganic substance is used as the protective layer, a protective film having superb resistance to oil, solvents, light and abrasion can be obtained. In addition to the high thermal resistance, these reflectors feature excellent regular reflectivity, forming clear and sharp reflected images or ensuring accurate light collection and distribution properties when combined with reflecting surfaces of any desired curvature.

The various reflectors listed in Table 1 have respective features as described below.

Reflectors 1, 3, 5 and 6 in Table 1 have a high aryl-content silicone resin layer coated on the substrate. This coated layer imparts the substrate with surface smoothness and heat resistance, and allows high energy vacuum-deposition of a light-reflective metal, such as by the sputtering and ion plating processes. A strong reflecting surface with a high reflectivity can thus be achieved.

Reflectors 2, 4 and 6 in Table 1 have a high aryl-content silicone resin layer coated as the outermost protective film. These reflectors feature a surface having high resistance to heat, chemicals, weathering and bending. of these, reflector 6 in Table 1 is most excellent with the above two characteristics.

Further, the layers mentioned in the present invention are not restricted to layers consisting of a simple substance. For example, the vacuum evaporating deposited layer of a light reflective metal may consist of a laminate of two metals, copper and aluminum, and the vacuum evaporating deposited layer of a light transmittable inorganic substance may consist of a laminate of two inorganics, silicon oxide and alumina.

EXAMPLE 1

A stainless steel sheet measuring 0.1 cm×10 cm×10 cm was coated with a high aryl silicone resin having a phenyl radical/(phenyl radical+methyl radical) ratio of 83.6 mol % and thermally cured. The coated substrate was held on substrate holder in a sputtering apparatus and placed 10 cm apart from a chromium plate used as the target. After evacuating the bell jar to $6 \times 10^{-6}$ Torr, argon gas was introduced to raise pressure to $3 \times 10^{-3}$ Torr. Keeping the shutter closed, a cleaning sputtering was conducted for five minutes at an output power of 1 KW, a frequency of 13.56 MHz and a coating pressure of $3 \times 10^{-3}$ Torr to clean the targer surface and stabilize discharge. Then the shutter was opened and chromium sputtering was carried out for ten minutes.

The chrominum reflector thus obtained was subjected to a heat test in an oven kept at 300° C. No change was observed in reflectivity and surface coloration indicated its excellent thermal resistance. No abnormal change was observed after immersion in city water for five days. The result of a cross-cut tape test was 100/100, showing its superb adhesion. It is suitable as a radiant-ray reflector in oil stoves and infrared roasters.

EXAMPLE 2

A glass plate measuring 0.2 cm×20 cm×20 cm was coated with a high aryl-content silicone resin having a phenyl radical/phenyl radical+methyl radical) ratio of 83.6 mol % and thermally cured. This coated substrate was put in the bell jar of a vacuum coater and held 25 cm directly above the hearth liner in parallel. After evacuating the bell jar to $2\times10^{-5}$ Torr, nitrogen was introduced to a pressure of $3\times10^{-3}$ Torr followed by evacuation to $2\times10^{-5}$ Torr. This operation was repeated twice more. A glow discharge was initiated in a nitrogen atmosphere at an impressed voltage of $-1$ KV, an EB output power of 1.5 KW and a coating pressure of $2\times10^{-3}$ Torr, as shown in 2 in Table 2. Metallic titanium was evaporated by electron beam and reaction deposition was carried out for five minutes with the substrate maintained at room temperature.

The three-layer structure reflector with a golden colored titanium nitride top layer thus obtained has a Mohs hardness of 2 to 3, and no scratches were observed when the light-reflective surface was rubbed strongly with gauze. The reflector was highly thermally-stable and no appreciable change was observed after a high temperature test conducted in an oven maintained at 180° C. Such a high resistance to abrasion and heat makes it suitable as a golden mirror of beautiful appearance to be used as interior and exterior materials in tearooms, restaurants and amusement facilities. This process can also be used for surface treatment of various ornaments, ashtray sets, etc. as well as reflectors of various configurations for graceful interior lighting fixtures.

EXAMPLE 3 AND 4

A glass plate (Example 3) and an aluminum sheet (Example 4), each measuring 0.1 cm×5 cm×10 cm, were used as the substrates. Each substrate was placed in the bell jar in a vacuum coater and held 30 cm directly above the hearth liner in parallel, and the system was evacuated to $2\times10^{-5}$ Torr. Aluminum and gunmetal were evaporated by heating with electron beams in Example 3 and 4, respectively. The vacuum depositing conditions are: impression voltage $-3$ KV, EB output power 2 KW, coating pressure 6 to $7\times10^{-5}$ Torr, and coating time 30 seconds in Example 3; impression voltage $-2$ KV, EB output power 4 KW, coating pressure 5 to $7\times10^{-5}$ Torr, and coating time one minute in Example 4. In both cases, deposition was carried out in the air atmosphere with the substrate maintained at room temperature.

The reflectors thus obtained were taken out of the bell jar, coated with a high aryl-content silicone resin having a phenyl radical/(phenyl radical+methyl radical) ratio of 83.6 mole %, and cured by heating.

The three-layer reflectors prepared above were subjected to a heat resistance test conducted in an oven maintained at 180° C. and to a water resistance test by immersion in city water for five days. No change was observed in both cases. The pieces were not attacked after immersion in 10% aqueous hydrochloric acid, sulfuric acid and caustic soda solution for 30 minutes. This high resistance to heat, water and chemicals makes them suitable for use under moist and high-temperature conditions, and as ceiling mirrors in buildings.

EXAMPLES 5 AND 6

An alumina ceramic plate measuring 0.3 cm×10 cm×20 cm (Example 5) and a stainless steel sheet measuring 0.12 cm×10 cm×20 cm (Example 6) were subjected to spinning to form two parabolic surfaces 20 cm in height and 40 cm in maximum diameter designed for a shade use as 400 W reflector. After polishing with airplane cloth, degreasing, cleaning and drying, the inner surfaces of these substrates were coated with a high aryl-content silicone resin having an phenyl radical/(phenyl radical+methyl radical) ratio of 83.6 mole %, cured by heating, and put separately in the bell jar in a vacuum coater. They were placed at 30 cm directly above the hearth liner in parallel in Example 5, and held with its bottom side at 20 cm directly above the hearth liner in parallel in Example 6. After setting the degree of vacuum in the bell jar at $9\times10^{-6}$ Torr, nickel and silver were evaporated by heating with electron beams in the air atmosphere in Example 5 and 6, respectively. The substrate was maintained at 150° C. in the former and at room temperature in the latter. As shown in 5 and 6 in Table 2, the coating conditions were: impression voltage $-3$ KV, EB output 1.5 KW, coating pressure 3 to $4\times10^{-5}$ Torr, and coating time one minute in Example 5; impression voltage $-3$ KV, EB output power 2.5 KW, coating pressure 1 to $2\times10^{-5}$ Torr, and coating time one minute in Example 6; After that, the system was evacuated to $1\times10^{-5}$ Torr and silicone dioxide was vacuum-deposited for five minutes in the air atmosphere in both cases at an impression voltage of $-0.5$ KV, an EB output power of 0.4 to 0.5 KW and a deposition pressure of 4 to $6\times10^{-5}$ Torr with the substrates maintained at room temperature. The four-layer reflector obtained in Example 5 showed no discoloration after immersion in city water. It is suitable as looking glasses used in public baths, etc. having higher safety than conventional ones because it is more difficult to break and no sharp fragments are produced if broken. The reflector in Example 6, on the other hand, has an extremely excellent regular reflectivity, allowing more accurate light distribution through simpler designs.

EXAMPLE 7 AND 8

An aluminum substrate measuring 0.1 cm×10 cm×15 cm is coated with a phenol resin in Example 7, while a synthetic mica plate was coated with a xylene solution of a polycarbonate resin in Example 8. After drying and curing by heat, these were separately put in the bell jar in a vacuum coater and held at 30 cm directly above the hearth liner in parallel. After evacuation to $2.5\times10^{-5}$ Torr, aluminum was evaporated by electron beams in the air atmosphere, and vacuum deposition was conducted for 30 seconds at an impression voltage of $-3$ KV, an EB output power of 1.5 to 2 KW and a deposition pressure of 6 to $8\times10^{-5}$ Torr, as shown in 7 and 8 in Table 2.

The vacuum-deposited pieces were taken out of the bell jar, coated with a high aryl-content silicone resin having an phenyl radical/(phenyl radical+methyl radical) ratio of 83.6 mole %, and heat cured. The reflectors thus obtained showed no change caused by droplets of a 10% aqueous solution of hydrochloric acid, sulfuric acid, caustic soda and cupric chloride placed on their surfaces. No change was observed after immersion in rainwater and city water for three days. With the excellent impact resistance, high safety, light weight as well as self-extinguishing or flame retardant property, these reflectors are best suited as interior mirrors used in stores, showrooms as well as floors and lobbies in buildings. They are also suitable as reflectors for lighting fixtures of various configuration to provide graceful interior illumination.

EXAMPLES 9 AND 10

A stainless steel sheet (Example 9) and a glass plate (Example 10), each measuring 0.1 cm×10 cm×15 cm, were coated with a high aryl-content silicone resin having a phenyl radical/(phenyl radical+methyl radical) ratio of 83.6 mole %, and cured by heating. These were separately put in the bell jar in a vacuum coater and held at 30 cm directly above the hearth liner in parallel. After evacuation to $2\times10^{-5}$ Torr, aluminum was evaporated by electron beams in the air atmosphere, and vacuum deposition was conducted for 30 seconds at an impression voltage of $-3$ KV, and EB output power of 1.5 to 2 KW and a deposition pressure of 3 to $5\times10^{-5}$ Torr, as shown in 9 and 10 in Table 2.

The reflectors thus prepared were taken out of the bell jar, and coated with a melamine resin in Example 9 and with a xylene solution of a polycarbonate resin in Example 10. They were allowed to stand at room temperature and cured in an oven.

The four-layer reflectors obtained showed a slightly better total reflectivity compared with conventional ones, such as aluminum sheets chemically polished and coated with anhydrous silicic acid by the wet process or anodic oxidation coated aluminum sheets, but the regular reflectivity was far more excellent. They were not attacked by droplets of 10% aqueous hydrochloric acid or sulfuric acid placed on the surface for 30 minutes. No change was also noticed after immersion in rainwater and city water for three days.

When used as decorative mirrors or floor materials in lobbies, showrooms, etc., they exhibit outstanding interior effects, making the room look lighter and more spaceous. They are also suitable as reflectors for lighting fixtures requiring high reflectivity.

EXAMPLES 11 AND 12

An aluminum sheet (Example 11) and a silica plate (in Example 12), each measuring 0.1 cm×10 cm×15 cm, were coated with a high aryl-content silicone resin having a phenyl radical/(phenyl radical+methyl radical) ratio of 83.6 mole %, and cured by heating. The coated substrates were separately put in the bell jar in a vacuum coater and held at 30 cm directly above the hearth liner in parallel. After evacuation to $9\times10^{-6}$ Toor, aluminum and silver were evaporated by electron beams in an air atomosphere in Examples 11 and 12, respectively. Vacuum deposition then followed under the following conditions as shown in 11 and 12 in Table 2: impression voltage $-3$ KV, EB output power 1.5 to 1.7 KW, deposition pressure 3 to $4\times10^{-6}$ Torr, and deposition time 30 seconds in Example 11; impression voltage $-3$ KV, EB output 2.5 KW, deposition pressure 1 to $2\times10^{-6}$ Torr, and deposition time one minute in Example 12. The substrates were maintained at room temperature in both cases.

The vacuum-deposited substrates were taken out of the bell jar, and coated with a high aryl-content silicone resin as defined above, and cured by heating. Compared with conventional ones, such as aluminum sheets chemically polished and coated with anhydrous silicic acid by the wet process or an anodic oxidation coating of aluminum sheets, the reflectors thus prepared showed a slightly better total reflectivity, but the regular reflectivity was markedly excellent, particularly in Example 12. Resistance to chemicals was also superb; no change was observed when droplets of 10% aqueous hydrochloric acid, sulfuric acid and caustic soda solution were placed on the surface and left for 30 minutes. They are advantageously used without corrosion hazards as reflectors in chemical plants, copper mines, copper refineries and other environments exposed to copper ions.

The accompanying table 1 lists the embodiments of the present invention. Table 2 tabulates the processing conditions in each embodiment.

TABLE 1

| | Multi-layer Reflectors of the Present Invention | | | | | | |
|---|---|---|---|---|---|---|---|
| | | 3 layers | | | 4 layers | | |
| No. | materials | 1 | 2 | 3 | 4 | 5 | 6 |
| 4 | Protective film | resin | ◎ | | ◎ | ○ | ◎ |
| | | inorganics (Vacuum Depository) | | ○ | | | |
| 3 | metal | metal (Vacuum Depository) | ○ | ○ | ○ | ○ | ○ | ○ |
| 2 | resin layer | resin | ◎ | | ◎ | ○ | ◎ | ◎ |
| 1 | substrate | nonmetal metal | ○ | ○ | ○ | ○ | ○ | ○ |

Note:
○ stands for general materials
◎ stands for high aryl silicon resins

TABLE 2

| | | Processing Conditions of Multi-layer Reflectors of the Present Invention | | | | | | | |
|---|---|---|---|---|---|---|---|---|---|
| | | 3 layers | | | | 4 layers | | | |
| layer | | 1 | | 2 | | 3 | | 4 | |
| No. | materials | 1 | 2 | 3 | 4 | 5 | 6 | 7 | 8 |
| 4 | protective layer | resin | | high aryl silicone resin | high aryl silicone resin | | | high aryl silicone resin | high aryl silicone resin |
| | | inorganics | | | | silicon oxide | silicon oxide | | |
| | | atmosphere | | | | air | air | | |
| | | applied voltage | | | | $-0.5$ KV | $-0.5$ KV | | |
| | | E.B out put | | | | $0.4 \sim 0.5$ KW | 0.5 KW | | |
| | | depositing pressure time | | | | Torr $4 \sim 5 \times 10^{-5}$ (5sec.) | Torr $4 \sim 6 \times 10^{-5}$ (5sec.) | | |
| 3 | metal | light reflective metal | Cr. | Ti | Al | gun metal | Ni | Ag | Al | Al |

TABLE 2-continued

Processing Conditions of Multi-layer Reflectors of the Present Invention

|   |   |   | | | | | | | | |
|---|---|---|---|---|---|---|---|---|---|---|
| | | atmosphere | argon | N | air | air | air | air | air | air |
| | | applied voltage | | −1 KV | −3 KV | −2 KV | −3 KV | −3 KV | −3 KV | −3 KV |
| | | E.B out put | | | 1.5 KW | 2 KW | 4 KW | 1.5 KW | 2.5 KW | 2 KW | 2 KW |
| | | depositing pressure time | Torr $3 \times 10^{-3}$ (10min.) | Torr $2 \times 10^{-3}$ (5min.) | Torr $6 \sim 7 \times 10^{-5}$ (30sec.) | Torr $5 \sim 7 \times 10^{-5}$ (1min.) | Torr $3 \sim 4 \times 10^{-5}$ (1min.) | Torr $1 \sim 2 \times 10^{-5}$ (1min.) | Torr $5 \sim 7 \times 10^{-5}$ (30sec.) | Torr $6 \sim 8 \times 10^{-5}$ (30sec.) |
| 2 | resin layer | resin | high aryl silicone resin | high aryl silicone resin | | | high aryl silicone resin | high aryl silicone resin | phenol resin | poly-carbonate |
| 1 | substrate | nonmetal | | | glass | glass | | Alumina seramics sheet | | | synthetic mica plate |
| | | metal | stainless steel | | | Al | | stainless steel reflector for projector | Al | |
| | | vacuum depositing | sputtering | reaction coating | applied voltage | Applied voltage | applied voltage | applied voltage | applied voltage | applied voltage |

| | | | | 4 layer | | | |
|---|---|---|---|---|---|---|---|
| | layer No. | | materials | 5 | | 6 | |
| | | | | 9 | 10 | 11 | 12 |
| 4 | protective layer | | resin | melamine resin | Poly-carbonate resin | high aryl silicone resin | high aryl silicone resin |
| | | | inorganics atmosphere applied voltage E.B out put depositing pressure time | | | | |
| 3 | metal | | light reflective metal | Al | Al | Al | Ag |
| | | | atmosphere | air | air | air | air |
| | | | applied voltage | −3 KV | −3 KV | −3 KV | −3 KV |
| | | | E.B out put | $1.5 \sim 2$ KW | $1.5 \sim 1.7$ KW | $1.5 \sim 1.7$ KW | 2.5 KW |
| | | | depositing pressure time | Torr $3 \sim 5 \times 10^{-5}$ (30sec.) | Torr $4 \sim 5 \times 10^{-5}$ (30sec.) | Torr $3 \sim 4 \times 10^{-5}$ (30sec.) | Torr $1 \sim 2 \times 10^{-5}$ (1min.) |
| 2 | resin layer | | resin | high aryl silicone resin | high aryl silicone resin | high aryl silicone resin | high aryl silicone resin |
| 1 | substrate | | nonmetal | | glass plate | | silica plate |
| | | | metal | stainless steel plate | | Al | |
| | | | vacuum depositing | applied voltage | applied voltage | applied voltage | applied voltage |

What we claim are:

1. A multi-layer coated reflector, having three or four layers, comprising a substrate capable of withstanding a vacuum deposition operation and a vacuum-deposited light-reflective metal layer, said reflector also including (1) a resin layer consisting essentially of a silicone resin interposed between said substrate and said metal layer, (2) a layer overcoated on said metal layer selected from the group consisting of a resin layer consisting essentially of silicone resin and an inorganic compound layer amorphous after deposition, with the proviso that where said inorganic compound layer is present, said reflector also includes a resin layer consisting essentially of a silicone resin interposed between said substrate and said metal layer, or (3) a resin layer interposed between said substrate and said metal layer and a resin layer overcoated on said metal layer, at least one of said resin layers being flex resistant and consisting essentially of a thermosett silicone resin, where in each of (1), (2) and (3), said silicone resin is a high aryl-content silicone resin containing an aryl radical/(aryl radical+alkyl radical) mole percent of 65% to 100% wherein said silicone resin is obtained by curing condensing and polymerizing a polyaralkylsiloxane represented by the formula:

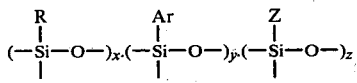

wherein R is a lower (carbon) alkyl radical; Ar is an aryl radical; Z represents a functional group which will condense to form a polymer and wherein in said polyaralkylsiloxane (1) the mole fraction of aryl radicals to the sum of the aryl and alkyl radicals is 0.65 to 1.00, the polymerizable functionality of 2 to 3 and the ratio of the number of carbon atoms to the number of silicone atoms is 4.25 to 16.

2. A multi-layer coated reflector of claim 1 wherein structure (1) is used.

3. A multi-layer coated reflector of claim 1 wherein structure (2) is used and the layer overcoated on said metal layer is the resin layer.

4. A multi-layer coated reflector of claim 1 wherein structure (2) is used, said resin layer is interposed between said substrate and said metal layer and said layer overcoated on said metal layer is an inorganic compound layer which is light-transmittable.

5. A multi-layer coated reflector of claim 1 wherein structure (3) is used, and wherein said layer overcoated on said metal layer is a resin layer consisting essentially of said silicone resin.

6. A multi-layer coated reflector of claim 1 wherein structure (3) is used, and wherein said resin layer interposed between said substrate and said metal layer consists essentially of said silicone resin and wherein the layer overcoated on said metal layer is a resin layer which is light-transmittable.

7. A multi-layer coated reflector of claim 1 wherein structure (3) is used, and wherein said resin layer interposed between said substrate and said metal layer consists essentially of said silicone resin and wherein said layer overcoated on said metal layer is a resin layer which is light-transmittable and consists essentially of said silicone resin.

8. The multi-layer coated reflector as set forth in claim 1 wherein R is methyl, ethyl or propyl; Ar is phenyl, tolyl, or naphthyl; and Z is a hydroxy group or an alkoxy group.

9. The multi-layer coated reflector as set forth in claim 8 wherein R is methyl, Ar is phenyl and Z is selected from the group consisting of a hydroxy group, an ethoxy group, a propoxy group, and a butyloxy group.

* * * * *